United States Patent [19]

Moran et al.

[11] Patent Number: 5,749,016

[45] Date of Patent: May 5, 1998

[54] PHOTOGRAPHIC FILM CARTRIDGE WITH DRIVE WHEEL ACTIVATED STATUS INDICATOR

[75] Inventors: P. W. T. Moran, Fairport, N.Y.; Joseph J. Rice, West Bridgford, England

[73] Assignee: Eastman Kodak Company, Rochester, N.Y.

[21] Appl. No.: 800,306

[22] Filed: Feb. 14, 1997

[51] Int. Cl.$^6$ ............................ G03B 19/02; G03B 17/26
[52] U.S. Cl. ............................ 396/515; 396/207; 396/284
[58] Field of Search ............................ 396/207, 387, 396/284, 398, 399, 400, 403, 404, 405, 411, 415, 511, 512, 514, 515, 516, 538

[56] References Cited

U.S. PATENT DOCUMENTS

| | | | |
|---|---|---|---|
| 4,417,793 | 11/1983 | Oyokota et al. | 396/284 |
| 4,474,443 | 10/1984 | Komatsuzaki et al. | 396/387 |
| 5,623,325 | 4/1997 | Manico et al. | 396/515 |

*Primary Examiner*—Safet Metjahic
*Assistant Examiner*—Nicholas J. Tuccillo
*Attorney, Agent, or Firm*—Edward Dugas

[57] ABSTRACT

An Indicator device for use with a web of material having perforations therein of a first pitch along an edge incorporates a wheel having a plurality of teeth that have a pitch that is less than the pitch of the perforations in the web of material. A spring urges the wheel into contact with the web of material such that at least one tooth on the wheel engages a perforation on the web of material. As the web and the wheel move relative to each other when a tooth is aligned with a perforation, the movement of the web of material then rotates the wheel until the tooth disengages with the aligned perforation. When a tooth is not aligned with a perforation on the web, the wheel and its teeth slide on the web of material until a tooth is aligned with a perforation. The diameter of the wheel and the associated teeth translating into the pitch between the teeth can thus be much smaller than a wheel with teeth having the same pitch as the perforations on the web material. A preferred embodiment of the invention incorporates the indicator device on a film cartridge to provide an indication when the film strip moves out of the cartridge. The preferred embodiment addresses at least one of the aforestated problems, i.e., the problem of knowing when the film leader is not properly engaged with the take-up spool, and the film is not seen to be advancing properly.

6 Claims, 3 Drawing Sheets

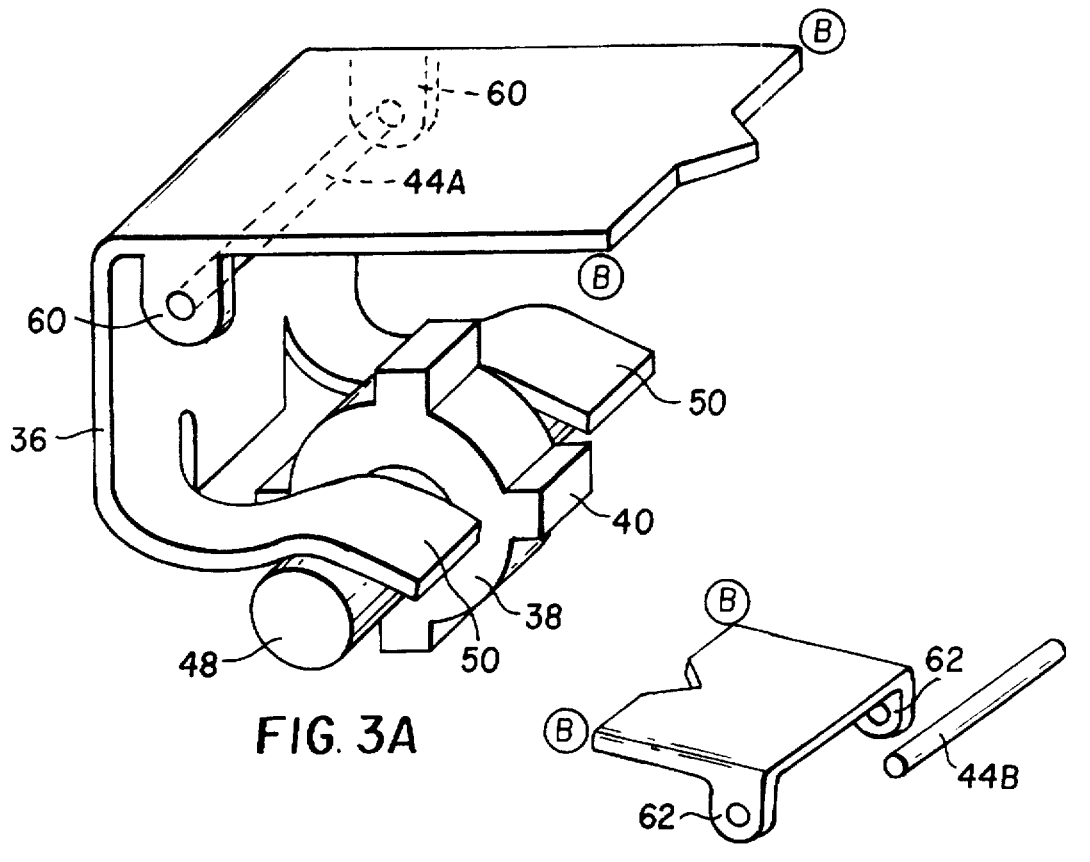
FIG. 3A
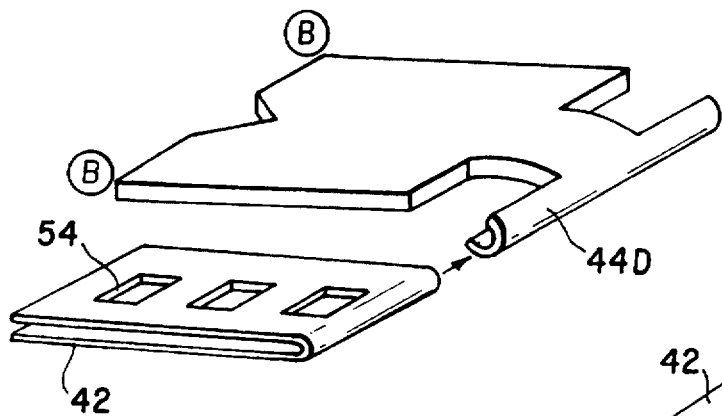
FIG. 3B
FIG. 3C
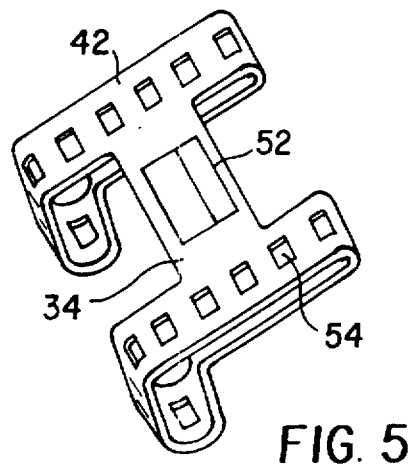
FIG. 5

PHOTOGRAPHIC FILM CARTRIDGE WITH DRIVE WHEEL ACTIVATED STATUS INDICATOR

CROSS-REFERENCE TO RELATED APPLICATIONS

The present application is related to U.S. application Ser. No. 08/766,958, filed Dec. 16, 1996, by Debesis, et al., and entitled, "Photographic Medium Cartridge With Magnetically Activated Status Indicator."

FIELD OF THE INVENTION

The present invention relates generally to a cartridge for a photographic filmstrip or other like media and more specifically to a cartridge having an indicator that is activated as the film or media is moved.

BACKGROUND OF THE INVENTION

Conventional cartridges for photographic filmstrips are known which include a supply spool onto which a filmstrip is wound, a surrounding cylindrical shell, suitable closures or caps at opposite ends of the shell, an exit slit through which the filmstrip may be withdrawn from or wound into the cartridge, and a suitable light-locking feature at the exit slit. In a well-known cartridge for 35 mm filmstrips, the light-locking feature comprises a pair of strips of plush material mounted on opposite sides of the exit slit to engage the filmstrip and prevent leakage of light into the cartridge. Cartridges for the recently announced Advanced Photographic System also are also known which include a light-locking door at the exit slit, rather than strips of plush material. At assembly of a cartridge using strips of plush material, a leading portion of the filmstrip is left extended through the exit slit to facilitate loading into a camera. In advanced cartridges, the entire filmstrip is wound into the cartridge and the door is closed, not to be opened until the cartridge has been installed in a camera. Motion picture film and microfilm cartridges also are known in which an elongated strip of film is enclosed within a light-tight housing and withdrawn through a light-locking feature prior to exposure.

To load most 35 mm cameras, a conventional film cartridge is inserted into a loading chamber on one side of a camera and the leading portion of the filmstrip is placed over a take-up spool on an opposite side. In some cameras, the leading portion must be manually attached to the take-up spool before a rear door of the camera is closed. Then, a film loading operation is performed by the user of the camera, for example, by manually pivoting or rotating a winding lever to rotate the take-up spool or depressing a shutter release button several times, until a sufficient length of the leading portion has been wound onto the take-up spool and the first frame has been properly positioned for exposure. In other 35 mm cameras, the leading portion is automatically secured to the take-up spool at the beginning of a film loading operation. For example, the take-up spool is rotated by a motor drive and one or more teeth of the spool engage perforations in the leading portion to wind the leading portion onto the spool until the first frame has been properly positioned. A spring-like deflector or similar feature may be provided on the rear door to press the leading portion against the take-up spool to ensure proper engagement with the teeth of the spool.

A problem that exists in some 35 mm cameras is that the leading portion of the filmstrip from a conventional cartridge may not properly engage with the take-up spool before the rear door is closed or may become disengaged during door closing or after the door is closed. Thus, the filmstrip will not be wound onto the take-up spool; and neither the first nor subsequent frames will be positioned for exposure. Since the rear door of the camera is closed, the user may not be aware of this situation. So, a need has existed for a cartridge feature for indicating when a conventional 35 mm filmstrip has been properly loaded into a camera causing the film to wind normally.

Some cameras have a film tension sensor which when activated causes an automatic rewind of the film back into the cartridge. On occasion a film strip may bind or resist advancement causing the set tension to be reached which in turn causes the film to be prematurely rewound.

After all exposures have been made on a conventional 35 mm filmstrip, the filmstrip is wound back into the cartridge; and the cartridge is removed from the camera. Typically, the entire filmstrip including the leader is wound past the strips of plush material and completely into the cartridge; so that, the leading portion is no longer visible or accessible to the user. A conventional 35 mm cartridge without a visible leading portion typically can be assumed to contain a filmstrip which has been fully exposed. However, a problem is that a user occasionally may neglect to wind an exposed filmstrip completely into a conventional cartridge; so that, the leading portion is left extended from the exit slit. Also some cameras leave a portion of the leader exposed upon rewind. In such a case, once the conventional cartridge of exposed film is removed from the camera, the user may not be able to distinguish it from a cartridge of unexposed film also having a leading portion extended from its exit slit. Thus, the user may accidentally load a cartridge of exposed film into a camera and produce a filmstrip of useless double exposures. Moreover, users sometimes accidentally rotate the spool of a cartridge of unexposed film; so that, the leading portion is drawn into the cartridge, making it impossible to distinguish such a cartridge of unexposed film from one of exposed film. Thus, the user may send a cartridge of unexposed film for developing and printing and waste an entire filmstrip. So a need has existed for a cartridge feature for indicating whether a conventional 35 mm filmstrip is advancing properly after loading into the camera.

SUMMARY OF THE INVENTION

The primary objective of the invention is to provide a cartridge containing a photographic filmstrip wherein the cartridge includes an indicator to show advancement of the filmstrip. Such indicator is intended to be viewable in cameras which have a window adjacent the cartridge when it is loaded in the camera.

Yet another objective is to provide such a cartridge for photographic film in which the indicator shows a number of exposures made or remaining to be made on the film.

The present invention is directed to overcoming one or more of the problems set forth above. Briefly summarized, according to one aspect of the present invention there is provided an indicator means for use with a web of material having perforations therein of a first pitch along an edge such as a film strip, comprising:

- a wheel having a plurality of teeth having a pitch which is less than the pitch of the perforations in the web of material; and
- means for urging said wheel into contact with said web of material such that at least one tooth on said wheel engages a perforation on said web of material as said web and said wheel move relative to each other so as to rotate said wheel when a tooth is aligned with a perforation and to slide the wheel on the web of material between perforations when a tooth is not aligned with a perforation.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantages:

It is inexpensive to implement;

Maintains the light tight feature of a 35 mm cartridge;

Provides a positive engagement with the film strip such that film movement is always sensed.

BRIEF DESCRIPTION OF THE DRAWINGS

FIGS. 3A, 3B, and 3C illustrate, in perspective view, internal components of the film cartridge status indicator;

FIG. 5 is a perspective view of a belt that is used in the status indicator of the present invention.

To facilitate understanding, identical reference numerals have been used, where possible, to designate identical elements that are common to the figures.

DETAILED DESCRIPTION OF THE INVENTION

Figure 1:
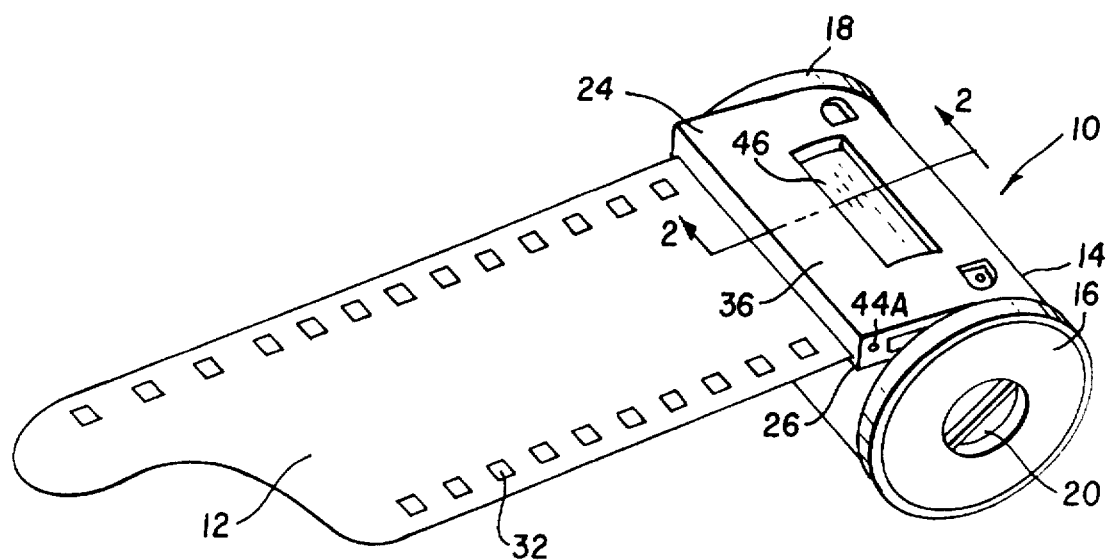
FIG. 1 is a perspective view of a film cartridge incorporating the status indicator of the present invention.
Figure 2:
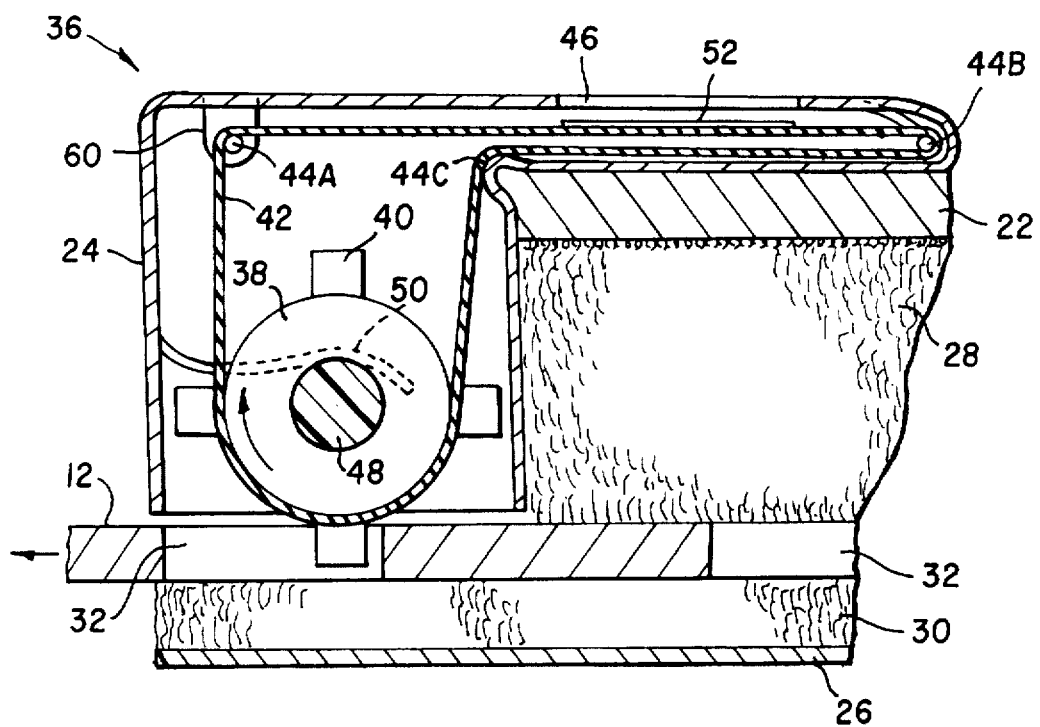
FIG. 2 is a section view taken along the section lines 2—2 of the film cartridge of FIG. 1.

Referring to FIGS. 1 and 2, a film cartridge 10 is formed with a body portion 14 capped with two end caps 16 and 18. The body portion 14 terminates with spaced apart lip portions 22 and 26. A light sealing plush material 28 and 30 is attached to the lip portions 22 and 26 to make the cartridge light tight. The cartridge 10 contains a spool 20 upon which is wound a film strip 12. The film strip has a plurality of equally spaced film perforations 32 along its outer edges.

An indicator assembly 36 is comprised of at least one star wheel 38 having a number of teeth 40 for engaging a belt 42 which is driven around shafts 44A and 44B, and an edge 44C all supported within a housing 24. Affixed to the outer surface of the belt 42 are graphic messages or indications, called graphics 52, that are viewable through a window 46. Springs 50 provide a downward pressure to the star wheel 38 via pressure on axles 48. The preferred embodiment utilizes two spaced apart star wheels 38 each engaging the perforations 32 on an assigned edge of the film 12.

As the film strip 12 is urged out of the cartridge 10 a tooth 40 on the star wheel 38 engages a film perforation opening 32. As the film advances further, the film perforation rotates the star wheel, which in turn advances the belt 42 and the graphics 52 within window 46. As the film 12 continues to advance the tooth 40 retracts from the film perforation 32 and the star wheel 38 slides on the film 12 until the next tooth 40 drops into the next film perforation 32. The pitch of the teeth 40 and the belt perforations 54 may be much less than the pitch of the film perforations 32 thereby permitting the use of a wheel having a substantially smaller diameter than would be necessary to support teeth having a pitch that would equal the pitch of the perforations.

Referring now to FIG. 3A, The star wheel 38 has its axle 48 pressed downward by the springs 50 that are formed by cutting a portion of the housing, forming the indicator assembly 36 on either side of the star wheel 38 and bending the portions so as to engage the axle 48. Tabs 60 project downward from the housing for rotatably supporting the shaft 44A. The tabs 60 may be formed with punched out portions of the housing or with a separate piece of sheet metal that is bonded to the housing. The opposite end of the belt 42 may optionally be supported for rotation by the arrangement of FIG. 3B wherein tabs 62 that may be punched out are used to rotatably support the shaft 44B or by the arrangement of FIG. 3C which forms the equivalent of the rotatable shaft 44B by using bent sheet metal 44D from the housing. The optional shaft arrangements of FIGS. 3A and 3B are integrated extensions of the FIG. 3A housing connected or extending from the points marked ○—○. When two star wheels 38 are used the shafts 44A and 44B and or 44D may extend across the length of the film cartridge.

Figure 4A:
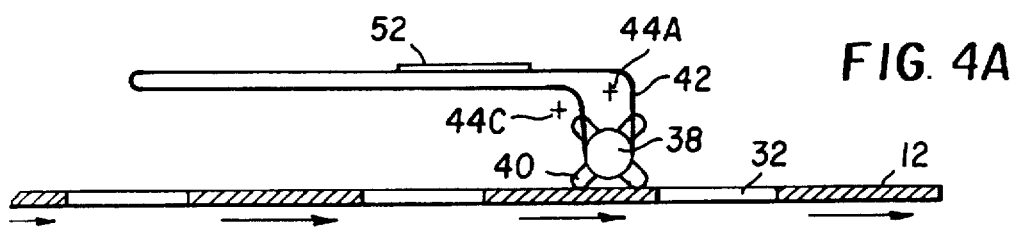
FIGS. 4A through 4D illustrate the operating cycle of the status indicator.
Figure 4B:
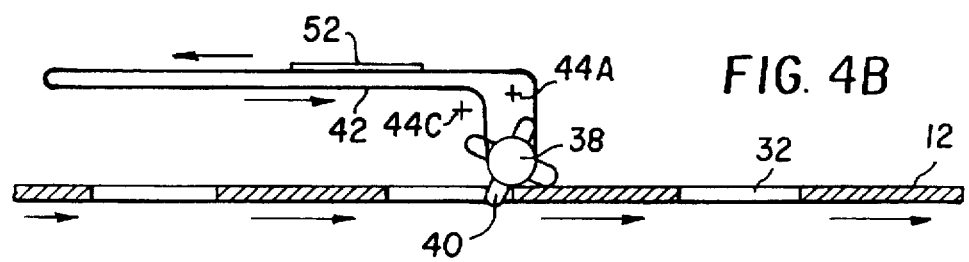
Figure 4C:
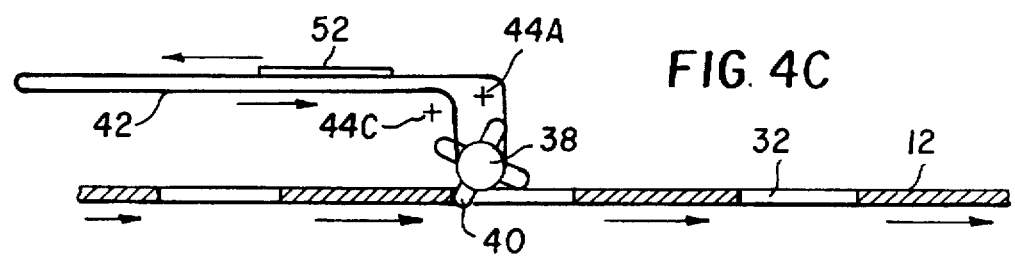
Figure 4D:
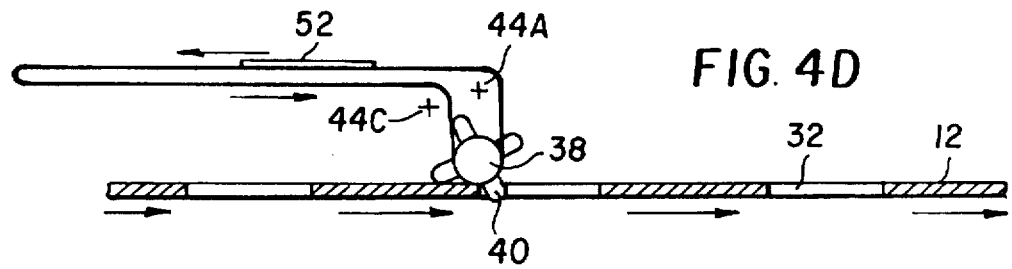

Referring now to FIGS. 4A through 4D, specifically in FIG. 4A, the star wheel 38 is shown stationary while its teeth 40 are shown dragging along the surface of the film strip 12 while the film and its next film perforation 32 are advancing. Next in FIG. 4B the tooth 40 is shown falling into the next film perforation 32, causing the star wheel 38 to rotate slightly. This condition is maintained until, as in FIG. 4C, the edge of film perforation 32 stubs against the tooth 40. As the film 12 continues to advance, the tooth 40 is pushed to the right until, as in FIG. 4D, it causes a gross rotation of the star wheel 38, which in turn causes a gross translation of belt 42 and of graphics 52 viewable in window 46. Further motion of the film causes the star wheel 38 to disengage with the film perforation 32 and to commence riding on the surface of the film 12 as indicated previously in FIG. 4A.

Referring now to FIG. 5, the belt 42 is shown more clearly in this figure with perforations 54 running along at least one edge. The central portion 34 of the belt 42 supports the graphics 52 which are viewable through the windows of those cameras which have windows and through the window 46. Graphics 52 may, for example, consist of numbers, letters, colors, or other indicia such as the line shown which advance, appear, or depart, in the window 46 as the film 12 is advanced.

The invention has been described with reference to preferred embodiments. However, it will be appreciated that variations and modifications can be effected by a person of ordinary skill in the art without departing from the scope of the invention.

PARTS LIST 10 film cartridge
12 film strip
14 body portion
16 end cap
18 end cap
20 spool
22 lip portion
24 housing
26 lip portion
28 light sealing plush material
30 light sealing plush material
32 film perforations 34 central portion of the belt
36 indicator assembly
38 star wheel
40 teeth
42 belt
44A shaft
44B shaft
44C edge
44D sheet metal shaft
46 window
48 axle
50 springs
52 graphics
54 belt perforations
60 tabs
62 tabs

We claim:

1. A film cartridge with status indicator, comprising:
   a hollow cartridge body having an exit slit;
   a film strip enclosed in said cartridge body to be withdrawn from or inserted into said cartridge body via said extra slit, said film strip having longitudinal edges with a series of edge perforations;
   a housing member supported by said cartridge body adjacent said exit slit;
   at least one star wheel rotatably supported by said housing member in a position to engage said edge perforations, whereby movement of said film strip through said slit will rotate said star wheel;
   an endless belt movably supported by said housing member, said belt further having perforations for engaging with said star wheel; and
   visible indicia of the status of the film strip affixed to said endless belt, whereby rotation of the star wheel will move the belt to indicate changes in the status of the film strip.

2. The film cartridge according to claim 1, wherein said star wheel includes a plurality of teeth positioned at a pitch which is less than the pitch of said edge perforations, so that said star wheel rotates a fraction of a turn with passage of each of said edge perforations, but slides without rotating between said edge perforations.

3. A cartridge according to claim 1, further comprising a resilient member for biasing said star wheel into engagement with said edge perforations.

4. The film cartridge according to claim 1 and further comprising a window positioned in said housing for direct viewing of the indicia affixed to said belt.

5. A film cartridge with status indicator, comprising:
   a hollow cartridge body having an exit slit;
   a film strip enclosed in said cartridge body to be withdrawn from or inserted into said cartridge body via said exit slit, said film strip having longitudinal edge with a series of edge perforations;
   at least one rotatable star wheel having a plurality of teeth positioned to engage said edge perforations, whereby movement of said film strip through said slit will rotate said star wheel;
   an endless belt having status indicia thereon and having perforations engaged with the teeth of said star wheel, whereby rotation of said star wheel will move said belt; and
   a window formed in the cartridge body for viewing indicia formed on the endless belt to indicate movement of the film strip from said exit slit.

6. Indicator means for use with a web of material having perforations therein of a first pitch along an edge, comprising:
   a wheel having a plurality of teeth having a pitch which is less than the pitch of the perforations in the web of material;
   means for urging said wheel into contact with said web of material such that at least one tooth on said wheel engages a perforation on said web of material as said web and said wheel move relative to each other so as to rotate said wheel when a tooth is aligned with a perforation and to slide the wheel on the web of material between perforations when a tooth is not aligned with a perforation; and
   a belt coupled to said wheel, said belt having perforations therein corresponding to the pitch of the teeth on said wheel, with at least one tooth of said wheel engaging a perforation on the belt for moving the belt as the wheel is rotated, said belt having an index thereon for visually indicating any movement of the belt.

* * * * *